United States Patent [19]
Richardson

[11] Patent Number: 5,530,451
[45] Date of Patent: Jun. 25, 1996

[54] REPEATER WITH LOW SPURIOUS TIME OUTPUTS

[75] Inventor: David L. Richardson, Arlington Heights, Ill.

[73] Assignee: Northrop Grumman Corporation, Los Angeles, Calif.

[21] Appl. No.: 226,795

[22] Filed: Apr. 12, 1994

[51] Int. Cl.⁶ .................................................. G01S 13/74
[52] U.S. Cl. ......................................... 342/203; 342/15
[58] Field of Search .......................... 342/15, 203, 201, 342/353, 14, 51, 187; 375/3, 1; 455/19

[56] References Cited

U.S. PATENT DOCUMENTS

| | | | |
|---|---|---|---|
| 3,611,139 | 10/1971 | George | 455/19 |
| 3,855,425 | 12/1974 | Keiser | 381/30 |
| 3,983,482 | 9/1976 | Doherty | 342/15 |
| 4,479,245 | 10/1984 | Batlivala et al. | 455/18 |
| 4,628,157 | 12/1986 | Chance et al. | 379/410 |
| 4,700,357 | 10/1987 | Ast | 375/4 |
| 4,937,812 | 6/1990 | Itoh et al. | 370/13.1 |
| 5,107,267 | 4/1992 | Janusas et al. | 342/15 |
| 5,223,842 | 6/1993 | Okurowski et al. | 342/201 |
| 5,233,626 | 8/1993 | Ames | 375/1 |
| 5,381,444 | 1/1995 | Tajima | 375/1 |

*Primary Examiner*—Daniel T. Pihulic
*Attorney, Agent, or Firm*—Terry J. Anderson; Karl J. Hoch, Jr.

[57] ABSTRACT

A device which increases the rate of reduction of spurious output signals includes a path capable of carrying a signal from an input to an output. A plurality of storage elements and a plurality of interspaced switches are serially positioned in the path. Isolation elements are positioned in the path between each storage element and each switch. Multiple reflections from the primary signal are capable of reducing in strength when rebounding between the isolation elements and the switches.

22 Claims, 4 Drawing Sheets

REPEATER WITH LOW SPURIOUS TIME OUTPUTS

FIELD OF THE INVENTION

The present invention relates to signal repeaters, and more particularly to a repeater which is capable of producing a reduced spurious time output.

BACKGROUND OF THE INVENTION

Signal repeaters are used to repeat a signal from a transmitter to a receiver, when the receiver is located too far from the transmitter to provide for reliable transmission; or, alternately, the receiver is positioned relative to the transmitter to limit the transmission for at least a portion of the time.

Certain repeaters are configured to use one antenna for both transmitting and receiving their signals. This use of a single antenna generally reduces the cost and the weight of the repeater. Reducing the weight of the repeater can permit a launch of a satellite based repeater with a smaller rocket. One difficulty with such repeaters is that unintended spurious output signals are produced in addition to the primary (intended) output signals. Even though any spurious output signal may be considered as noise, and as noise is undesirable; repeaters which provide spurious outputs with amplitudes which do not decay at a sufficient rate produce a particularly undesirable situation.

One example of a single antenna repeater is illustrated in U.S. Pat. No. 3,983,482, issued Sep. 28, 1976 to Doherty. This device is not usable in high gain application because it oscillates. This invention provides no capability for continuous wave signals. There is also a requirement to detect an input signal (or triggering from a receiver) to make the above repeater alter to the transmit mode.

Another example of a single antenna repeater is illustrated in U.S. Pat. No. 5,107,267, issued Apr. 21, 1992 to Janusas et al. This repeater is band limited to 500 MHz due to the sampling circuit in the receiver. This device also encodes the output for decoding, identification, scrambling, and jamming by another receiver. There is a switch (12) which is required to be repositioned between a receive position and a transmit position in order for the system to properly function.

It would be desirable to provide some technique, applicable to single antenna repeaters, which increases the rate of decay of spurious signal amplitude over time with the repeater being operable over a wide band-width. It would be desirable to provide a relatively straight-forward construction for such a repeater. It is the goal of the present disclosure to provide such a system.

SUMMARY OF THE INVENTION

The present invention relates to a device which includes a path capable of carrying a signal from an input to an output. A storage element and a switch are positioned in the path. An isolation element is positioned in the path between the storage element and the switch, such that a signal will reduce in strength between the isolation element and the switch.

BRIEF DESCRIPTION OF THE DRAWING FIGURES

DETAILED DESCRIPTION OF THE PRESENT INVENTION

Figure 1A:
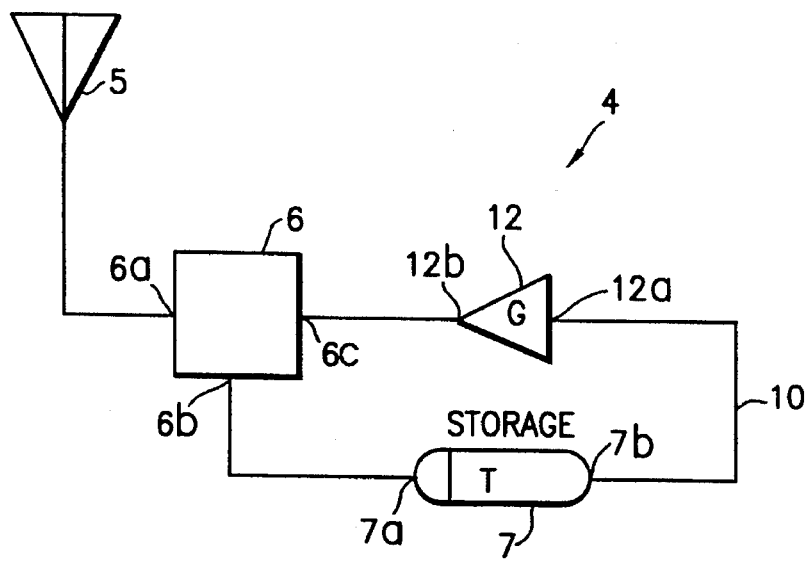
FIG. 1A illustrates a prior art single antenna repeater system.

In this disclosure, the specific elements used, the number of delay portions, and the timing, is intended to be illustrative in nature and not limiting in scope. Identical reference characters may be provided to similar devices which perform similar functions in the different embodiments.

Figure 1B:
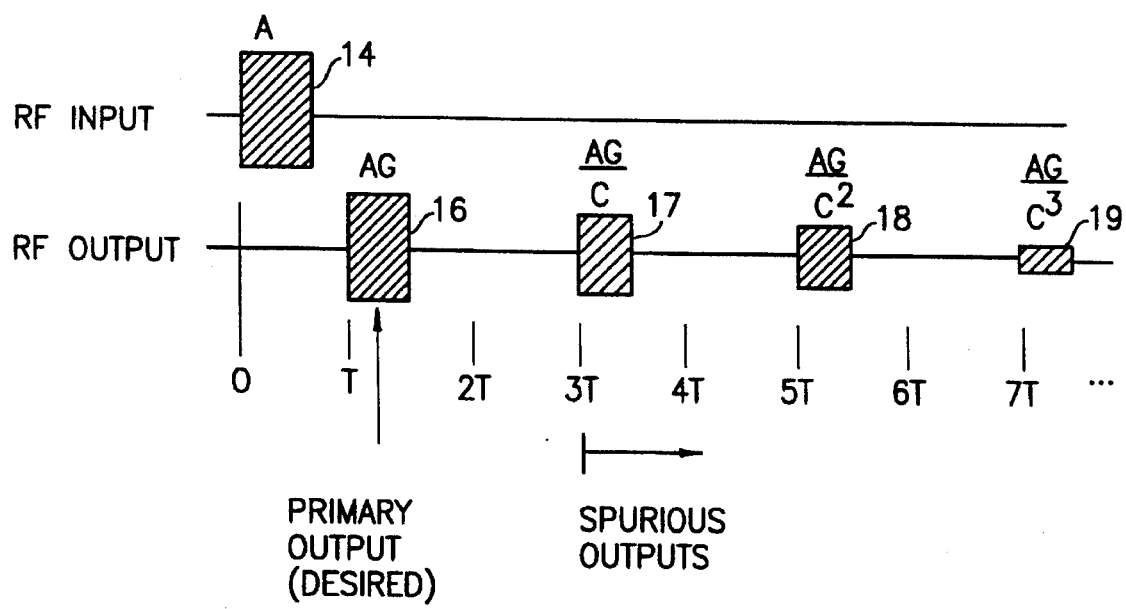
FIG. 1B illustrates the signal outputs (real and spurious) of the FIG. 1A embodiment.

FIGS. 1A and 1B illustrate a prior art embodiment of a single antenna repeater 4, and the output signal waveforms, respectively. The FIG. 1A embodiment includes an antenna 5 which is used for both transmitting and receiving; an isolation element 6 which is configured to route any signal coming from the antenna 5 from port 6a to port 6b with very little loss, while simultaneously routing all signals which have circulated about loop 10 from port 6c to port 6a, also with very little loss. Contained within the loop 10 is a storage element 7 with ports 7a and 7b. Any signal entering the storage element 7 at port 7a will exit port 7b T seconds after it entered. Similarly, any signal entering the storage element 7 at port 7b will exit port 7a T seconds after it has entered. Also contained in the loop 10 is an amplifier 12 with ports 12a and 12b. Any signal entering the amplifier 12 at port 12a will exit port 12b with a gain of G; while any signal entering the amplifier 12 at port 12b will be substantially blocked. Some of the signal entering the amplifier 12 at port 12a will be reflected and return to port 7b of the storage element 7. Part of the signal transmitted from the storage element 7 out of port 7a will be reflected by port 6b of the isolation element 6. It is this reflection and retransmission of signals through the storage element 7 which will produce the spurious outputs described below relative to FIG. 1B.

FIG. 1B illustrates a timing pattern of an input signal 14 which is applied to the antenna 5, and the resultant output signals 16, 17, 18, and 19 which are output from the antenna 5. The primary output signal 16 is the signal which results from the signal being transmitted from the antenna 5; passing from ports 6a to 6b of the isolation element 6; traversing through storage element 7 and amplifier 12; and passing through ports 6c to 6a of the isolation element 6, to be retransmitted via the antenna 5. The primary output signal 16 is the intended signal, and forms the basic function of the single antenna repeater 4 of the prior art. The storage element 7 is configured such that the output signal will be transmitted from the antenna 5 some period T after it has been received by the antenna 5 in a manner known in the art. The amplifier 12 is selected such that it will create a sufficiently large output signal (considering the strength of the input signal, the distance between the transmitter and receiver, the size of the signal receiver, and other factors) to be received by the receiver to which the single antenna repeater 4 is transmitting.

Unfortunately, in addition to the primary output signal 16 described in the prior paragraph, the single antenna repeater 4 also produces spurious output signals 17, 18, and 19. These signals are produced when the primary output signal 16 traverses loop 10 and contacts the input port 12a of the amplifier 12 or the port 6c of the isolation element 6. When this occurs, a certain amount of the original signal will be reflected and pass in an opposite direction (clockwise in FIG. 1) through the storage element 7, and will exit from port 7a T seconds after it has entered port 7b. Part of this signal will rebound off port 6b of the isolation element 6, and be retransmitted in a counter-clockwise direction as illustrated in FIG. 1A, following the same routing as described in the prior paragraph by the primary output signal 16, until it eventually is transmitted from the antenna 5. This process is repeated, with each spurious output signal being delayed by a period 2T (T for the clockwise transmission through the storage element 7, and T for the counter-clockwise transmission therethrough). Each spurious signal is reduced by a quotient of $C^n$ from the primary output signal where n is the number of the spurious signal (n=1,2,3,etc.), that will be output at a time 2T later, and by the amount as described below. Even though this reduction occurs rapidly, it is desirable to reduce the amplitude of the spurious outputs even more rapidly. Each spurious output can be considered as noise diminishing signal quality, especially in those cases where there are multiple repeaters through which each signal must be transmitted.

There is a particular problem in the case when the repeater gain is large (determined by amplifier 12); then reflections from the antenna 5, which recirculate in the repeater, may be strong enough to cause an oscillation in loop 10.

Figure 2A:
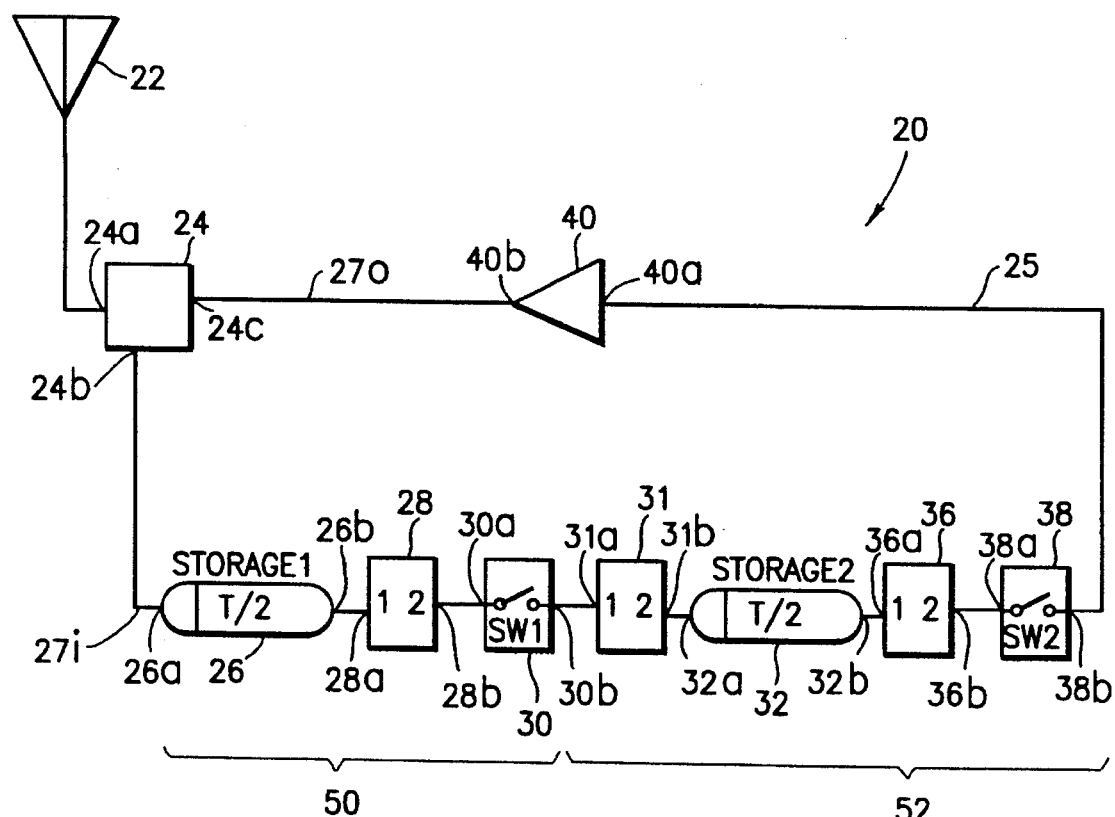
FIG. 2A illustrates one embodiment of single antenna repeater system of the present invention.

FIG. 2A illustrates one embodiment of the present invention which is designed to increase the rate at which the spurious signals are reduced. A single antenna repeater 20, which is capable of reducing the time spurious outputs signals at a single frequency, is illustrated in FIG. 2A. An incoming signal is received by an antenna 22 at time 0. The antenna 22 is utilized for both transmitting and receiving signals. The signal is thereupon passed through ports 24a to 24b of an isolation element 24 into an input 27i of a delay path 25, which is connected to the isolation element at both an input end 27i and an output end 27o. The input end 27i of the delay path 25 is connected to a storage element 26 at port 26a. The storage element 26 transmits an identical signal T/2 seconds after it receives a signal in port 26a at port 26b. The signal is thereupon passed from port 28a to port 28b of an isolation element 28, and on to port 30a of switch 30. The switch 30 closes at time T/2 and passes the signal via port 30b to port 31a of an isolation element 31, and from port 31b into a storage element 32. The storage element 32 also transmits an identical output signal to its received input signal T/2 seconds after it receives that input signal. The primary output signal then travels from port 36a to 36b of an isolation element 36, and then to the switch 38. Switch 38 is timed to close at time T. The primary output signal at the output of the switch 38 is applied to port 40a of an amplifier 40, and an amplified version of the primary output signal is produced at port 40b, which is in electrical communication with port 24c of the isolation element 24. Most of this signal exits from port 24a to be transmitted by the antenna as the primary output signal.

In this specification, the isolation elements 6, 24 (in the FIGS. 1A and 2A embodiments, respectively) are typically such elements as circulators, magic tee hybrids, directional couplers, or switches. An ideal isolation element passes all signals applied at port 24a to port 24b, and all of the signals applied at port 24c to port 24a. The remainder of all signals are completely blocked and converted into heat. Even though such idealized isolation devices do not exist, devices which function very closely to the ideal do exist.

Figure 2B:
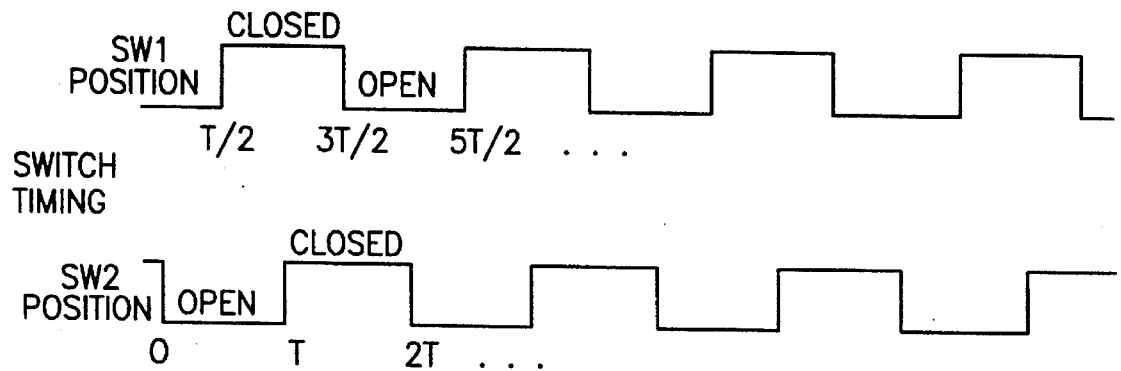
FIG. 2B illustrates one embodiment of the timing of the switches SW1 and SW2 of the FIG. 2A embodiment.
Figure 2C:
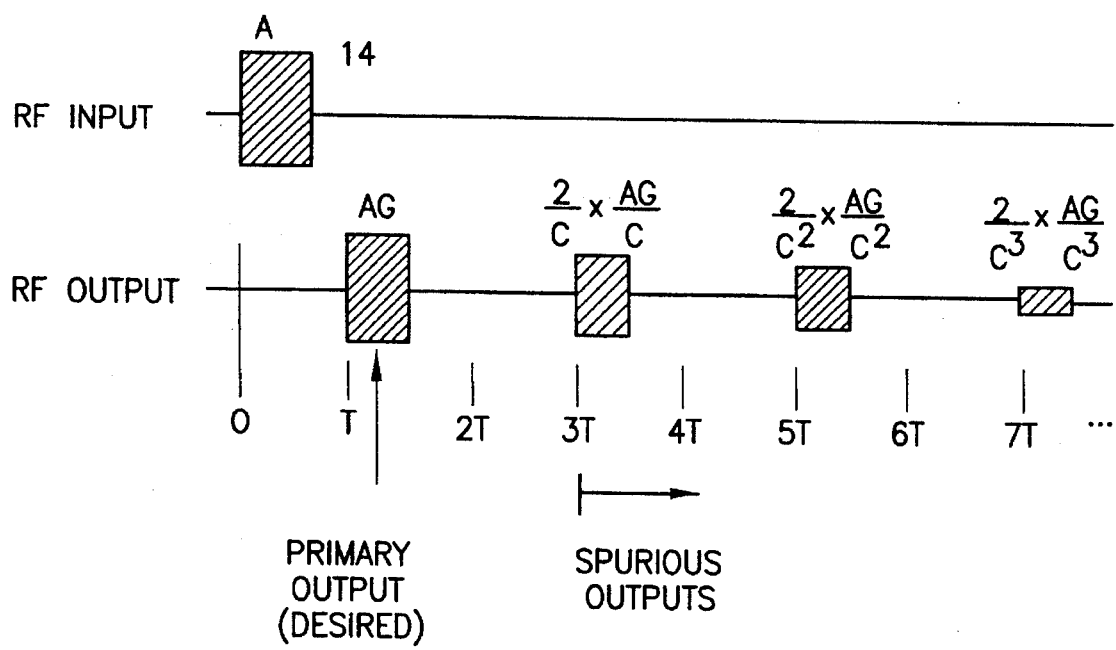
FIG. 2C illustrates the signal outputs (real and spurious) of the FIGS. 2A and 2B embodiment.

Isolation elements 28, 31, 36 in the FIG. 2A embodiment are typically such elements as circulators or amplifiers, as are well known to those skilled in the art. The isolation elements 28, 31, and 36 are positioned adjacent to a respective ports 30a and 30b of switch 30, and port 38a of switch 38. During those periods that the switches are closed, the isolation elements let the signal pass through to or from the switch virtually as if the isolation element did not exist. During those periods that the switches are open, however, the signals pass between the isolation element and the switch and continue to rebound therebetween (the switch reflects a large percentage of the relevant signals when it is in an open position) during which the energy of the signal is quickly dissipated as heat. The timing of the switches 30, 38, and the corresponding output for an input pulse is illustrated in FIG. 2B. The primary output signal occurs at time T. The spurious components (those signals which occur at times kT where k=3, 5, 7, etc.) of the output signal decay at a faster rate than with the FIG. 1A prior art embodiment. The spurious signal delay of the FIG. 2A embodiment now occurs with a factor $2/c^n$, where n=the number of the spurious event and C=(power reflection coefficient)$^2$ of the isolation elements. Return loss in dB is $10 \log_{10} C$. The multiplying constant, 2, depends upon the nature of the isolation elements 28, 31, 36.

The spurious outputs can be reflected from the antenna input, though this is not illustrated in FIG. 1B to avoid confusion with the primary reflections and the antenna reflections. The combined reflections will produce undesired oscillations when the repeater gain is large, especially if the incoming pulse is wide or the signal is a continuous wave (hereafter referred to as "CW").

The single antenna repeater system 20 contains two delay portions 50, 52. The first delay portion 50 contains the first storage element 26, the isolation element 28, and port 30a of the switch 30. The second delay portion 52 contains the port 30b of the switch 30, the storage element 32, the isolation elements 31 and 36, and the switch 38. The first delay portion 50 and the second delay portion 52 therefore are formed of similar, if not identical, elements. Both the first delay portion and the second delay portion function to delay a received signal for a given period, and then retransmit it, while reducing the amplitude of the signal relatively quickly during those periods that at least one of the switches 30, 36 are open.

The above concept illustrated in FIGS. 2A and 2B can be modified by increasing the number of delay portions 50, 52 from 2 to whatever value is desired. The larger the number of delay elements, the greater the time it takes the signal to traverse the delay path 25. Increasing the number of delay elements will increase the rate of reduction of the amplitude of the spurious outputs which, in turn, means that the output signal of the delay path 25 will be a truer signal.

Mathematical Formulae and Calculations

The following mathematical equations are applicable to the single antenna repeaters 4, 20 of FIGS. 1A and 2A respectively. The simplifying assumptions is that the gain of the signal to and from the antenna is unity in both the transmit and the receive modes, respectively; the gains of the isolation elements 24, 28, 31, 36 are unity; the storage element gains are unity in both directions; the amplifier gain is G in the forward direction and zero in the reverse direction; the gain of the switches are unity when they are closed, and zero when they are open. It is also assumed that when the switches are open in the FIG. 2A embodiment, the signals will be rebounding between the switches and the isolation elements resulting in a quick reduction in the signal amplitude. Based on these assumptions, the following equations can be derived:

Present Invention (FIG. 2A embodiment):

The primary output signal has an amplitude of AG, and is delayed by time T.

$$\left[ \frac{ADG}{C^{2N}} \right]$$

This signal is delayed by a period T(2N+1), where

N=1,2,3,...

| | |
|---|---|
| A = Input | D = 2 |
| G = Gain of amplifier | T = Storage time of storage element. |
| C = (power reflection coefficient)$^2$, where the power reflection coefficient is for the isolation elements and amplifier (recall these are all identical). | |

Higher order output terms from the first storage element in the FIG. 2A embodiment are ignored since they are very small.

Prior Art (FIG. 1A embodiment):

The primary output signal has an amplitude of AG, and is delayed by time T.

$$\left[ \frac{A}{C^N} \right]$$

This signal is delayed by a period T(2N+1), where

N=1,2,3,...

| | |
|---|---|
| A = Input | T = Storage time of storage element. |
| G = Gain of Amplifier | |
| C = (power reflection coefficient)$^2$ where the power reflection coefficient is of the amplifier and isolation element. | |

The difference in the spurious terms between the FIG. 1A prior art embodiment and the FIG. 2A present invention embodiment is $2/C^n$. The present invention has much lower spurious output signals than the prior art because this factor is much less than 1. The above factor of 2 depends upon the circuit components selected, and may be altered.

Application

Figure 3A:
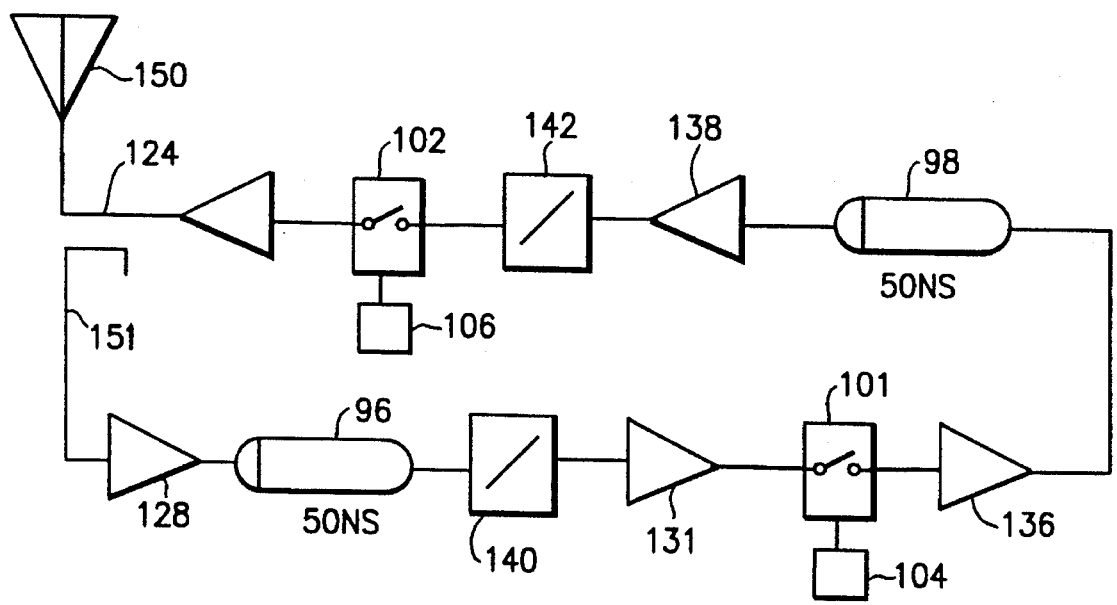
FIG. 3A illustrates an alternate embodiment of single antenna repeater of the present invention.

Another embodiment of a single antenna repeater 94 (also known as a low time spurious repeater) is illustrated in FIG. 3A. The storage elements consist of two RF coaxial cable delay lines which function as storage elements 96, 98 of 50 ns each. The switches 101, 102 are preferably electronically controlled devices which are operated by controls 104, 106, respectively. The isolation element 124 is a directional coupler. The isolation elements 128, 131, 136, 138 are implemented as amplifiers, and are combined with a lossy response from the delay lines. The gain is implemented by amplifiers before, between, and after the delay lines to reduce the noise figure and improve the dynamic range.

Also illustrated in the FIG. 3A embodiment are a plurality of equalizers 140, 142 which provide an increased gain as the frequency of the signal increases. The characteristics of the equalizers are well known in the art, and will not be further detailed here.

Figure 3B:
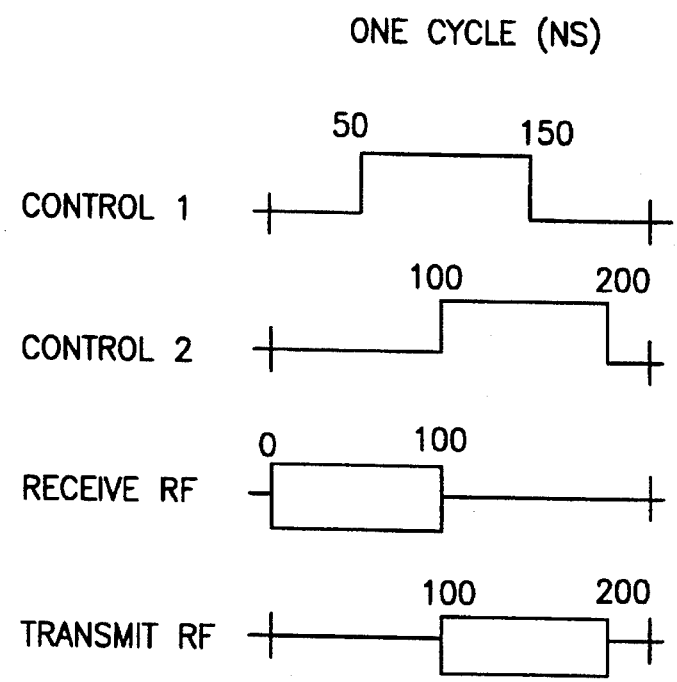
FIG. 3B illustrates the timing of the switches of the present invention, as well as the timing of the input and output signals.

The timing of the switches 101, 102 are illustrated in FIG. 3B as control 1 and control 2, respectively. The time at which an input signal is applied to an antenna 150 which functions as an input is illustrated in FIG. 3B as well. The resultant output is applied to the antenna 150 which also functions as an output, is also illustrated in FIG. 3B. The FIG. 2A and the FIG. 3A embodiments, which function quite similarly, both provide configurations which will reduce the duration which spurious signals last in single antenna repeaters.

There are many disadvantages of certain present invention repeaters. These disadvantages include the limiting of the repeater to signals having a relatively narrow signal band; requiring a detection of signal reception for triggering the repeater; adding modulation to the transmitted signal for operation with other receivers, transmitters, or repeaters; and limiting continuous wave signals from being accurately repeated. None of these disadvantages are characteristic of the present invention.

There are advantages of the FIGS. 2A and 3A embodiments as compared to certain prior art single antenna repeaters, which include the fact that the present invention embodiments may be applied to extremely broad band signals. Additionally, the present invention has superior signal handling for continuous wave inputs than the prior art single antenna repeaters. Finally, the present invention embodiments may be used in high gain circuits. These facts make the present invention adaptable to many signal configurations. Considering that it is uncertain which types of signals many of the presently deployed repeaters will be encountering in a relatively short time, such features which permit great adaptability in repeaters are highly desirable.

I claim:

1. A device comprising:

a storage element, said storage element having a characteristic time delay;

a switching means, said switching means being switchably controlled at a rate that is a function of said characteristic time delay; and an isolation element electrically coupled between said storage element and said switching means, such that a transient signal will reduce in strength between said isolation element and said switching means, when said switching means is open.

2. The device as described in claim 1, wherein a switching means and an isolation element are located on either side of said storage element.

3. The device as described in claim 1, wherein said switching means is moveable between an open position and a closed position, when said switching means is in said closed position it permits passage of a signal therethrough, when said switching means is in said open position it will reflect a considerable portion of said signal.

4. The device as described in claim 1, further comprising a first switching means on the side of the storage element adjacent an input, and a second switching means on the side of the storage element adjacent an output, with a first isolation element positioned between said first switching means and said storage element and a second isolation element positioned between said second switch and said storage element.

5. The device as described in claim 4, further comprising:

timing means for closing said first switching means when an input signal is entering said device, and closing said second switching means when the signal is exiting said device.

6. The device as described in claim 5, wherein said timing means open said first switching means for a portion of the time that the signal is not entering said device, and opening said second switching means for a portion of the time when the signal is not exiting said device.

7. The device as described in claim 1, wherein said input and said output are in communication with the same antenna.

8. The device as described in claim 1, wherein said reduction in strength is accomplished by the signal rebounding between the switching means and the isolation element.

9. The device as described in claim 1, wherein said device increases the rate at which the amplitude of spurious output signals decay.

10. The device as described in claim 1, wherein said device is applied to a single antenna repeater.

11. A method for increasing the rate of amplitude reduction for spurious output signals, comprising the steps of:

positioning a plurality of storage elements in series within a path from an input to an output;

providing a switch means on one side of one of said storage element;

closing said switch means when a primary signal is traversing said switch means from the input to the output; and opening said switch means for a considerable period when the primary signal is not traversing said switch means from the input to the output.

12. The method as described in claim 11, wherein said method further comprises a means for reducing signal strength applied to the switch means when the switch means is in said open position.

13. The method as described in claim 11, wherein a switch means is located on both sides of said storage element.

14. A repeater, comprising:

a single antenna means for receiving input signals and transmitting output signals from said repeater;

a loop which receives said input signals and outputs said output signals;

a directional coupler means for substantially continually permitting passage of the input signals from said single antenna means to said loop, and passage of the output signals from the loop to the single antenna means;

at least one storage element connected within said loop, said at least one storage element having a characteristic time delay;

at least one switching means connected within said loop, said at least one switching means being switchably controlled at a rate that is a function of said characteristic time delay; and an isolation element electrically coupled between said storage element and said at least one switching means to reduce a signal in strength between said isolation element and said switching means when said switching means is open.

15. A method as set forth in claim 12, wherein when said switch means opens, at least a portion of a spurious signal is reflected by said switch means, said at least a portion of a spurious signal thereafter rebounds between said switch means and said means for reducing signal strength, and reduces in strength.

16. A repeater as set forth in claim 14, wherein said at least one switching means reflects at least a portion of a signal when said at least one switching means is open, and wherein said at least a portion of a signal thereafter rebounds and reduces in strength between said at least one switching means and an isolation element that is coupled to said at least one switching means.

17. A repeater as set forth in claim 14, wherein said isolation element has an associated power reflection coefficient, wherein at least a portion of said output signals comprises a spurious signal, and wherein said spurious signal has an amplitude that is a function of said power reflection coefficient.

18. A repeater as set forth in claim 14, wherein at least a portion of said output signals comprises a spurious signal, and wherein said spurious signal has an amplitude which reduces at a rate that is a function of said characteristic time delay of said at least one storage element.

19. A repeater as set forth in claim 14, wherein at least a portion of said output signals comprises a spurious signal, and wherein said spurious signal has an amplitude which reduces at a rate that is a function of the number of storage elements within said repeater.

20. A repeater as set forth in claim 14, further comprising at least one equalizer interposed within said loop.

21. A repeater, comprising:

a plurality of storage elements positioned in series within a path from an input to an output;

a switching means positioned on one side of one of said storage elements, said switching means being closed when a primary signal is traversing said switching means from said input to said output, said switching means being opened for a considerable period when the primary signal is not traversing said switching means from said input to said output; and means for reducing a strength of a transient signal traversing said path when said switching means is open.

22. A repeater as set forth in claim 21, wherein a first switching means is located on one side of each of said storage elements, and a second switching means is located on a second side of each of said storage elements.

* * * * *